(12) United States Patent
Johal

(10) Patent No.: US 9,326,533 B2
(45) Date of Patent: May 3, 2016

(54) METHOD FOR DRYING BIOMATERIALS

(71) Applicant: Grain Processing Corporation, Muscatine, IA (US)

(72) Inventor: Sarjit Johal, Iowa City, IA (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 14/804,635

(22) Filed: Jul. 21, 2015

(65) Prior Publication Data
US 2015/0320083 A1 Nov. 12, 2015

Related U.S. Application Data

(62) Division of application No. 14/613,568, filed on Feb. 4, 2015, now Pat. No. 9,113,646, which is a division of application No. 13/326,558, filed on Dec. 15, 2011, now Pat. No. 8,974,778, which is a division of application No. 10/371,730, filed on Feb. 21, 2003, now Pat. No. 8,147,821.

(60) Provisional application No. 60/358,633, filed on Feb. 21, 2002.

(51) Int. Cl.
| | |
|---|---|
| *A23K 1/00* | (2006.01) |
| *A23K 1/14* | (2006.01) |
| *A23K 1/16* | (2006.01) |
| *A23L 1/03* | (2006.01) |
| *A23L 1/054* | (2006.01) |
| *A23L 1/172* | (2006.01) |
| *C08L 5/00* | (2006.01) |
| *C08L 89/00* | (2006.01) |
| *C08L 97/02* | (2006.01) |
| *C08L 99/00* | (2006.01) |

(52) U.S. Cl.
CPC ............... *A23K 1/009* (2013.01); *A23K 1/146* (2013.01); *A23K 1/1643* (2013.01); *A23L 1/0345* (2013.01); *A23L 1/054* (2013.01); *A23L 1/172* (2013.01); *C08L 5/00* (2013.01); *C08L 89/00* (2013.01); *C08L 97/02* (2013.01); *C08L 99/00* (2013.01); *A23Y 2220/00* (2013.01); *A23Y 2260/00* (2013.01); *A23Y 2280/00* (2013.01); *A23Y 2300/00* (2013.01); *A23Y 2320/00* (2013.01); *Y10S 426/805* (2013.01)

(58) Field of Classification Search
None
See application file for complete search history.

(56) References Cited

U.S. PATENT DOCUMENTS 6,098,569 A * 8/2000 Kent ............... A01K 1/0155
119/171

* cited by examiner

Primary Examiner — Robert A Wax
Assistant Examiner — Melissa Mercier
(74) Attorney, Agent, or Firm — Fitch, Even, Tabin & Flannery LLP

(57) ABSTRACT

The present invention provides a means to concentrate, dry and formulate biomaterials such as polysaccharides, gums and related biopolymers, and microorganisms such as cells, spores, and the like from dilute solutions using spent germ and other oil bearing residues. In addition, the spent germ can serve as a carrier for such biomaterials. The sorbed materials are useful in animal feeds.

22 Claims, No Drawings

METHOD FOR DRYING BIOMATERIALS

RELATED APPLICATION

This application is a division of prior application Ser. No. 14/613,568, filed Feb. 4, 2015 which is a division of application Ser. No. 13/326,558, filed Dec. 15, 2011 which is a division of application Ser. No. 10/371,730, filed Feb. 21, 2003, which claims priority to Application No. 60/358,633, filed Feb. 21, 2002. All prior applications are hereby incorporated herein by reference in their entireties.

FIELD OF THE INVENTION

This invention relates to the use of spent oil-bearing agricultural residues as processing aids for the drying of biomaterials. The invention also relates to a method for using dried biomaterials, for instance, as an animal feed or an ingredient in an animal feed.

BACKGROUND OF THE INVENTION

High molecular weight biopolymers such as fungal glucans and microbial polysaccharides are produced by fermentation. Upon completion of fermentation, a complex broth results. To harvest biopolymers from the broth, typically the fermentation broth is either recovered, diluted, and dried without additional handling, or processed further to remove a substantial quantity of the biomass and then dried. In both instances, the polysaccharide-containing broth is homogenized, diluted (two to three fold) and the polysaccharide harvested by direct precipitation with one-half to two volumes of alcohol. In order to effect complete recovery of the polysaccharide, this mixture can be cooled (<10° C.) and allowed to stand for several hours. The precipitated materials are then recovered from the mixture with a screen or sieve, dried in an oven, milled, and packaged. The final product of the native or processed polysaccharide broth is a dry, flowable powder.

While the dry product form is easy to transport and handle, the harvesting process suffers from numerous drawbacks. The most significant drawbacks stem from the handling, processing and recovery of the large quantities of alcohol. The process is costly, and not economical without a nearly complete recovery of the alcohol. The dried powders are also difficult to rehydrate. The drying processes may negatively affect some of the physiochemical attributes. For example, entanglement of the biopolymers during precipitation and drying can lead to clipping of the polymer and the generation of lower molecular weight species during the milling and rehydration processes. This problem is amplified if lengthy high shear agitation is required to hydrate the polymer. These events can reduce the functionality and ultimately the value of the biopolymer.

Other drying procedures, including drum drying and spray drying, have been investigated but not commercialized. It is believed that, in general, the practical and functional limitations of these drying technologies as well as the economics and the final product attributes significantly reduce the utility of these systems.

Alternative recovery processes such as membrane filtration have also been proposed and developed to concentrate the fermentation broth. The product of the membrane concentration processes, for example, is a 90-95% aqueous concentrate or gel. While this process addresses some of the liabilities of the precipitation process, the concentrate (or gel) product form cannot be efficiently or economically transported, nor handled as a standard material in most industrial applications.

Still other precipitation and recovery methods are known in the art; however, none of these offers any significant advantage to the standard alcohol precipitation procedure. Consequently, the need or preference for a dry product coupled with the cost and inherent limitations of the alcohol precipitation procedure has limited the development and application of these and related functional biomaterials in an array of industrial applications.

A significant drawback to many prior art-drying processes is that the process offers kills live microorganisms that are present in an aqueous medium, such as a fermentation broth. For instance, lactic acid bacteria in a whole both or a concentrated cell slurry are not readily amenable to drying to yield viable dry bacteria. When high yields of viable dry cells are desired, the most common way to dry such cells in commercial practice is to lyophilize the cells in the presence of excipients. Lyophilization is expensive, and the lyophilized cells ordinarily cannot be stored in an open package at room temperature. Such cells often are stored within an oxygen barrier packaging material, often with an oxygen scavenging material or in gel form. In addition, cell availability generally degrades after storage at room temperature for more than a few weeks. These drawbacks have hindered the use of lactic acid bacteria, especially probiotic use in animal feeds.

Another problem in the art relates to the drying of oily materials. Oils, lipids and related biomolecules often need to be extracted using solvents from fermentation propagated cells such as algae and related microorganisms. Prior to performing the solvent extraction, however, the cells need to be concentrated, i.e., the broth "dewatered," in order to attain a cost-effective extraction and process. In the absence of a concentration step, however, live quantity of solvent required and costs associated therewith can be very high. Typically, this is now achieved by concentrating the cells either by centrifugation or filtration or drying the concentrated cells by spray drying and then extracting the spray-dried cells. Although possible, this is often not practical or very feasible especially in applications where the cells are "leaky" or fragile and exuding oily materials. It is known that the presence of oily materials complicates drying by roost known technologies.

The invention seeks to provide, in preferred embodiments, a drying operation that is inexpensive and produces a dry flowable powder with good handling and packaging characteristics that can be formulated to retain the functional attributes of the native biomolecule.

THE INVENTION

It has been found that spent oil bearing residues, in particular spent corn germ, function as excellent sorbents. Such residues can be placed in contact with an aqueous mixture of a polysaccharide or a microorganism (such as lactic acid bacterium) to thereby form a composite that includes the polysaccharide gum absorbed on or in the sorbent. The composite thus formed may be subjected to drying to thereby form a dry composite. The sorbent thus provides an excellent vehicle for drying such gums and microorganisms.

The invention finds particular application to the drying of fermentation broths that contain microorganisms, such as "light" corn steep liquor. The dried sorbed fermentation broth may be used as an animal feed to thereby provide a probiotic effect to the animal. Ordinarily, the dried fermentation broth will be provided in the form of an animal feed that contains at least one additional nutrient. In such cases, other components of the fermentation broth will be sorbed in the sorbent and will provide other nutritive benefits to the animal. It is believed that in some cases such other components will provide a prebiotic effect to the animal in connection with the probiotic effect provided by the microorganism. The invention thus provides an advantage over lyophilized microorganisms and polysaccharides prepared from fermentation broths, wherein the other nutritive components of the fermentation broth are normally discarded after the microorganisms have been harvested. Dried polysaccharides and dried microorganisms that are obtained from sources other than a fermentation broth also may be used as or in connection with animal feeds.

DESCRIPTION OF THE PREFERRED EMBODIMENTS

The invention contemplates the use of a sorbent to absorb and/or to adsorb various biomaterials. Generally, "absorption" is a term used to refer to the penetration of one substance into the inner structure of another substance, whereas "adsorption" is used to refer to the adherence of atoms, ions, or molecules onto the surface of another material. It is believed that one or both phenomena occur in conjunction with the invention, although it is contemplated that the material may serve as a sorbent even if only one of the two phenomena is present. By "sorbed within" is contemplated the sorption of a substance in or on the sorbent.

In accordance with the invention, the sorbent can comprise a spent grain germ, a seed meal or mixtures thereof. With respect to spent germ, the germ may be derived from any suitable grain, such as corn, wheat, soy, sorghum, barley, and the like. The germ used in connection with the invention is "spent" by which is contemplated the removal of most or all of the oil originally present in the germ by a method such as solvent or expeller extraction. With respect to seed meal, by "seed" is contemplated that part of a plant that is capable of forming a new plant upon germination, e.g., whole grains of wheat, including the fruit or fruit-like structure housing the seed. The seed meal comprises a spent oil bearing seed residue, which has been expended of all or most oil originally present by such methods as solvent and expeller extraction. The extracted residue is then ground, by which is contemplated the reduction of the residue to smaller particles, preferably to a semi-coarse to fine powder. The seeds may or may not be dehulled prior to expelling oil and grinding. Examples of suitable meals include soybean meal, linseed meal, sunflower meal, cottonseed meal, rapeseed meal, peanut meal, safflower seed meal, and the like. Mixtures of any of the foregoing may be employed. The germ or meal may be washed to reduce or remove odor components.

Corn germ is the major depository for lipids and minerals in the kernel. Spent corn germ, the fraction remaining after oil is expelled from the germ, is a by-product of the corn wet milling process. Spent germ is very inexpensive, readily biodegradable and abundant; several million tons of spent corn germ are produced annually. After extraction of the lipids, the residual spent germ consists of a flexible, compact, porous structure with many intercellular spaces and pits. The open pore structure of spent germ structurally resembles an open pore polyurethane foam. The natural, porous structure of the germ serves as a non-denaturing highly efficient sponge to absorb water, solutes, molecules and particles as large as cells and spores from a complex mixture such as a fermentation broth, thereby passively transforming a dilute, low solids fluid to a slurry or paste while still retaining a relatively low solids content and retaining the structural integrity of the entrapped and adsorbed substances. This is possible because of the high absorbency of spent germ. A quantity of spent corn germ, for example, will readily absorb about 2.5 to 3 times its weight in water or about its weight in oil.

Generally, an aqueous medium that includes one or more microbially derived polysaccharides, one or more microorganisms, or mixtures thereof, may be blended with a sorbent as hereinbefore described to thereby cause at least some of the polysaccharide or microorganism to become sorbed within the sorbent. The sorbent and aqueous mixture may be blended together in any suitable amount. Preferably, the sorbent is added to the aqueous mixture in an amount ranging from about 1-50%, more preferably about 3-30%, more preferably about 5-20%, and even more preferably about 10-20% by total weight of the aqueous mixture (based on dry germ weight). The latter addition range is most preferred because the resulting slurry can be pumped and yet remain low in solids. Preferably, the blend germ and aqueous mixture is agitated, such as with a mechanical or manual stirrer, to effectuate sorption. In some embodiments, the sorption operation is conducted at room temperature (25° C.). In other embodiments, the sorption operation is conducted at an elevated temperature, for instance, a temperature ranging from 30-40° C., to enhance the sorption, and yet in a further embodiment, the sorption is conducted at a relatively low temperature, such as a temperature ranging from 1-15° C. Often, heating will be desirable, because healing generally will decrease the viscosity of the aqueous medium and of the composite slurry. In some cases, particularly in connection with sorption of a microorganism, it will be desirable to cool the aqueous medium to inhibit bioactivity of the microorganism. It is contemplated that the mixture may be an aqueous medium that includes the material of interest dissolved or suspended or otherwise carried in the medium.

The invention finds particular applicability to the drying of a microbially derived polysaccharide, in particular a polysaccharide gum. Such gums are generally derived as a product of microbial fermentation. Upon fermentation, a complex aqueous fermentation broth that includes the polysaccharide is provided. Other polysaccharides are derived from plants. Examples of microbially derived and otherwise derived polysaccharides suitable for use in conjunction with the invention include xanthan gum, gellan gum, β-glucan gums (such as sclerogulcan), arabinogalactan, alginates, carrageenan gum, locust bean gum, dextran, tragacanth, xylan, alternan and so forth. In some cases, such as alternan (which is generated by *Leuconostoc mesenteroides*) the polysaccharide will be present in an aqueous medium along with the microorganism that has generated the polysaccharide. Similar polysaccharide/microorganism broths are purportedly described in WO 01/57234. In such cases the sorbent may be used to sorb both the microorganism and the polysaccharide. In any event, although the invention contemplates the sorption of a polysaccharide from any source, the preferred embodiments contemplate the sorption of a polysaccharide from a fermentation broth. Generally, other components of such fermentation broth will be sorbed along with the polysaccharide, thus providing potential benefits in applications such as animal feed.

After the sorption operation, a composite that includes aqueous slurry of sorbent having the material of interest sorbed within is provided. This material is preferably subjected to a drying operation, whereby the moisture content is reduced to less then 20% by total weight. Ordinarily, enough sorbent should be added to absorb most free liquid in the aqueous medium. If not, excess liquid present in the slurry will be decanted or filtered off thereby leaving a wet composite. This wet composite may be dried in any suitable dryer, such as a tunnel dryer, drum dryer, fluid bed dryer, or the like, to any suitable moisture content. Preferably, the moisture content is less than 15% by total weight, more preferably, less than 12% by total weight, more preferably, less than 10% by total weight, and most preferably, less than 7% by total weight. In many embodiments, the final moisture content will be from 1-5% by total weight, sometimes from 2-4% by total weight. The time and temperature of drying often are not critical and may vary in accordance with the equipment used, the intended application, or the stability of the sorbed material.

The invention is also contemplated to be applicable to the sorption of a microorganism from an aqueous medium. Preferably the microorganism is a cellular organism, which is a bacterium, spore, yeast, fungus, or algae. The microorganism alternatively may be non-cellular, such as a virus or bacterial phage. For instance, the microorganism may be a bacterium or yeast selected from among the genera *Lactobacillus, Leuconostoc, Pediococcus, Enterococcus, Propionibacterium, Bifidobacterium*, and *Saccharomyces*.

In some preferred embodiments, the *Lactobacillus* species can include *Lactobacillus acidophilus, Lactobacillus brevis, Lactobacillus bulgaricus, Lactobacillus casei, Lactobacillus cellobiosus, Lactobacillus curvatus, Lactobacillus delbruekii, Lactobacillus fermentum, Lactobacillus helveticus, Lactobacillus lastic, Lactobacillus plantarum, Lactobacillus euterii*, or combinations thereof. The *Pediococcus* can include, for example, *Pediococcus acidilacticii, Pediococcus cerevisiae* (damnosus), *Pediococcus pentosacceus*, and combinations thereof. The *Enterococcus* can include, for example, *Enterococcus cremoris, Enterococcue diacetylactis, Enterococcus faecium, Enterococcus intermedius, Enterococcus lactis, Enterococcus thermophilus*, and combinations thereof. The *Leuconostoc* species can include, for example, *Leuconostoc mesenteroides*. The *Propionibacterium* can include, for example, *Propionibacterium freudenreichii, Propionibacterium shermanii*, and combinations thereof. The *Bifodobacterium* can include, for example, *Bifidobacterium adollescentis, Bifidobacterium animalis, Bifidobacterium bifidum, Bifidobacterium infantis, Bifidobacterium longum, Bifidobacterium thermphilum* and combinations thereof. Other microorganisms can include, for example, a *Streptococcus* species (such as *Streptococcus cremoris* and *Streptococcus faecalis*), *Azotobacter, Achorobacter, Beijerinckia, Pseudomonas, Bacillus, Rhizobium, Trichoderma, Anabaena, Cylindrospenmun, Nostoc, Volvox*, and *Oscillaria*. Particularly suitable for use as probiotic microorganisms are yeasts such as *Saccharomyces* and bacteria such as the genera *Bifidobacterium, Propinibacterium, Streptococcus, Enterococcus, Lactococcous*, and *Lactobacillus*. Combinations of any of the foregoing or other microorganisms or with any polysaccharide are also possible.

The microorganism may be present in the aqueous medium in any suitable amount. Preferably, the microorganism is present in the aqueous medium in an amount of at least $10^3$ CFU/ml, more preferably in the range of $10^6$-$10^9$ CFU/ml. The sorbent is preferably is used to sorb at least 25%, more preferably at least 50%, and most preferably at least 75% of the biomass of the microorganisms present in the aqueous medium. The dried sorbent preferably contains at least $10^2$ CFU/g upon drying based upon the dry sorbent weight and more preferably, at least $10^3$ CFU/g, and most preferably at least $10^6$ CFU/g.

The dry biomaterial is susceptible to numerous uses. For instance, the dry biomaterial may be fed to an animal, or used in conjunction with an animal feed. It is contemplated that the feed may be intended for any ruminant or non-ruminant animal (potentially including humans). Generally, the sorbed biomaterial will be provided in addition to an additional animal nutrient in an animal feed. The additional animal nutrient can include, for example, a vitamin, a mineral, a protein, a carbohydrate, or fiber component (the fiber constituting a "nutrient" within the meaning of this invention). In highly preferred embodiments of the invention, a dried microorganism is fed to an animal in an amount effective to provide a probiotic effect. Particularly when the microorganism is derived from a fermentation broth, other components of the broth will provide nutritive benefit to the animal, and, it is believed, also may provide a prebiotic effect as well.

The invention also contemplates that a polysaccharide or microorganism can be obtained from a dried microorganism or polysaccharide as hereto full described. Generally, the method of this embodiment of the invention contemplates the hydration of this sorbent that includes the material of interest and recovery of the material thus obtained. In a case of a microorganism, the microorganism preferably is recovered in an amount ranging from about 2-80% of the original viable microorganism, more preferably from about 50-80%. In these embodiments of the invention, the sorbent serves as a carrier for the polysaccharide or microorganism. It is contemplated in some embodiments of the invention that, during the drying operation, a film-polymer such as a cellulosic material, a gum, a starch-derived material, or a synthetic material may be incorporated into the aqueous medium (if not already present) or used to coat the sorbed material. In such cases, the recovery or release of the material of interest from the sorbent may be slower then would otherwise be observed absent the use of such film-forming polymer. The invention contemplates the selection of the type and amount of film-forming polymer used in drying a polysaccharide or microorganism in contemplation of achieving a delayed release.

The invention is deemed to find excellent applicability to the sorption of an oil-producing microorganism, such as an algae. Upon sorption and drying of such materials, the sorbent will comprise an oily material from which oil can be recovered by extraction via expeller and solvent extraction or the like. For instance, certain algae are known to produce Ω-n fatty acids, the number n ranging from 1-6 (such as Ω-3 and Ω-6 tatty acids). The invention provides a means for recovery of such oily materials.

In some embodiments, the dry sorbed material is further processed, such as by way of amalgamation. For instance, the dry sorbent may be formed into a pellet, flake, granule, ribbon or other suitable form via any suitable technique. In some embodiments, the amalgamated material can be made more durable by incorporating a binder or cohesiveness agent. A binder may comprise, for instance, an extrudate of corn hulls and sodium hydroxide (as taught in copending application Ser. No. 09/901,342, filed Jul. 9, 2001), lignin, lignosulfonate, hemicellulose, cellulose, water, a starch hydrolyzate, a fatty acid, or a clay material such as bentonite or zeolites. In such embodiments, the binder preferably is present in an amount of about 5% by weight. The amalgamated material can include a polysaccharide cohesiveness agent to enhance the cohesiveness thereof. The cohesiveness agent is believed to provide additional hydroxyl groups which enhance the bond between proteins present within the sorbent granules. Any suitable polysaccharide may be used in conjunction with these embodiments of the invention, and thus, for example, the cohesiveness agent may comprise one or more polysaccharides such as dextrin, maltodextrins, starches, flours, and the like. Preferably, when used, the cohesiveness agent comprises a starch, and most preferably, the cohesiveness agent comprises cornstarch. When used, the polysaccharide cohesiveness agent may be present in any amount suitable to enhance the cohesiveness of the sorbent granules. Generally, the cohesiveness agent may be present on a dry basis amount ranging up to about 45% by weight, more preferably in an amount ranging from 3-35% by weight, and most preferably in an amount ranging from 5-25% by weight. Some or all of this material may come from starch that is naturally present in the sorbent.

When a polysaccharide cohesivesness agent is used, a supplemental cohesiveness agent preferable also is used. The supplemental cohesiveness agent can be any that enhances protein-protein and/or protein-starch interactions. Any suitable ionic salt may be used in conjunction with this embodiment of the invention. For instance, the supplemental cohesiveness agent may be selected from alkyl and alkaline earth salts or common anions such as the halide, nitrate, nitrite, carbonate, phosphate, sulfate, and bicarbonate salts, and the like. Exemplary supplemental cohesiveness agents include sodium chloride, calcium chloride, sodium carbonate, calcium carbonate, sodium bicarbonate, and mixtures thereof. When used, the supplemental cohesiveness agent preferably is present in an amount of at least 0.05% by dry basis weight of a composition exclusive of the polysaccharide cohesiveness agent. More preferable, the supplemental cohesiveness agent is present in amount ranging from 0.05% to about 10% by weight, more preferably, about 0.1 to about 8% by weight, and most preferably, about 1.5 to about 4% by weight. In particularly preferred embodiments, the supplemental cohesiveness agent is present in an amount of about 2% by weight of the composition. Other potential additives include surfactants, dispersants, binders, buffers, preservatives, and the like, to the extent that additives are not incompatible with the intended use of the sorbed material.

The following examples further illustrate the invention but should not be construed as in any way limiting its scope.

Example 1/Comparative Examples 1 and 2

Materials:

Scleroglucan, a fungal glucan produced by select strains of the genus *Sclerotia*, fermentation broth was processed using membrane diafiltration (10,000 MWCO cut membrane) to remove residual media and small metabolites. The final solids content was about 1.5%. The glucan content was estimated to be 1%.

Dry spent corn germ (20 gm)
Diatomaceous earth (25 gm)
Maltodextrin, Maltrin® M040 (25 gm) (sold by Grain Processing Corporation of Muscatine Iowa)
Stirrer with standard propeller configuration
Forced air oven. Temperature: 90° C.
Four 100 gram batches of scleroglucan broth were prepared.

Batch 1: To the first batch was added about 20 grams of dry spent corn germ with stirring. Stirring was continued vigorously to thoroughly and uniformly mix the spent germ. Stirring continued at high speed for about 3-5 minutes. The stirrer propeller was removed, and the thick slurry was transferred to a drying dish. The material was placed in the drying oven.

Comparative Example 1 (Batch 2): To the second 100 gram batch of glucan, 25 grams of diatomaceous earth was added while stirring vigorously. After the complete addition of diatomaceous earth, the mixture was stirred at high speed for another 3-5 minutes. The slurry was transferred to a drying dish and then to the drying oven.

Comparative Example 2 (Batch 3): Comparative Example 1 was repeated except that maltodextrin was used as the additive. The drying dish containing the slurry was transferred to the drying oven.

Control (Batch 4): For a control, 25 grams of water was added to the final 100 gram batch of glucan. The mixture was stirred as per the three samples (Batches 1-3) and transferred to oven in a drying dish.

The samples were dried for about 17 hours, then removed from the oven and cooled to room temperature. The following properties were observed.

TABLE I

| Example | Samples | Polymer Content | Recovery | Appearance** | Hydration/ Viscosity |
|---|---|---|---|---|---|
| Example 1 | Glucan + Germ (Batch 1) | 4.5% | 22 gm | Granular, flowable powder | Excellent |
| Comparative Example 1 | Glucan + DE* (Batch 2) | 3.8% | 28 gm | Dusty powder | Poor |
| Comparative Example 2 | Glucan + Maltodextrin (Batch 3) | 3.8% | 27 gm | Lumpy, granular powder | Poor |
| Control | Control (Batch 4) | 100% | 1.6 gm | Little recoverable | Excellent |

*DE = diatomaceous earth
**Appearance after drying and milling. Milled using a coffee grinder.

Example 2

Materials:

Scleroglucan (as in example 1, with the glucan content estimated be 0.75-1%)

Dry spent corn germ (20 gm)

Stirrer with standard propeller configuration

Forced air oven. Temperature: 90° C.

Three solutions of UF-filtered scleroglucan broth were prepared (Same material as in Example 1).

Solution 1: About 20 grams of spent corn germ was added to about 100 grams broth with stirring. The mixture was vigorously stirred for a few minutes. The thick slurry was transferred to a drying dish, placed in the drying oven (about 93° C.), and dried for about 17 hours.

Solution 2: About 10 grams of spent corn germ was added to about 110 grams glucan broth with stirring. This material was processed in the same manner as Solution 1.

Solution 3: About 5 grams of spent germ was added to about 115 grams glucan broth and processed as per conditions employed for Solutions 1 and 2.

| Estimated glucan content: | Solution 1 | 4.6%, |
|---|---|---|
| | Solution 2 | 9.5%, and |
| | Solution 3 | 18.5%. |

Solutions of each material were prepared by adding 1 gram of material per 50 mL of water. General attributes of the rehydrated glucan solutions are highlighted in Table II.

TABLE II

| Samples | Appearance | Hydration Attributes | Hydrated Solution Attributes* |
|---|---|---|---|
| Solution 1 | Granular, flowable | Hydration evident within 5-10 min.; fully hydrated within about 4 hours. | Thickness evident but still fluid; settling of germ noted |
| Solution 2 | Granular, flowable | Comparable to Solution 1 | Substantially higher viscosity than Solution 1 but fluid; no settling noted. |
| Solution 3 | Granular, flecks of film | Comparable to Solutions 1 and 2 | Extremely thick and gelatinous |

*Solutions hydrated for about 4 hours using a low speed platform shaker.

The characteristics of the hydrated glucan solutions are consistent with the features expected at the calculated glucan concentrations. For example, Solution 1 exhibits the features of a 0.5% glucan solution whereas Solution 3 behaves in a manner generally consistent with the thickness and suspension attributes expected of a 2% glucan solution.

Example 3

This example describes the feasibility of using spent germ to dry and improve the handling of several different fermentation-derived liquors by absorbing several different materials onto spent germ.

The fermentation-derived liquors tested were 1) concentrated corn steep liquor (about 45% dry solids basis (dsb)); 2) lactic acid fermentation broth with cells removed (about 10% dry solids basis); and 3) concentrated lactic acid fermentation broth with cells removed (about 27% dry solids basis). The concentrated lactic acid fermentation broth was prepared by rotary evaporations of a lactic acid fermentation broth with cells removed (i.e., a spent broth) sample. Aliquots of the respective liquor samples were then applied to spent corn germ in the quantities shown in Table III. Alter addition, the liquors and spent germ were mixed.

It was observed that the gems readily absorbed and retained each of these liquors, even the concentrated, viscous (about 900 cP) production plant corn steep liquor. No free liquid was present and the lactic acid fermentation broth with cells removed samples even fell dry to the touch. The "loaded" spent germ samples were transferred to aluminum pans and placed in a forced air oven set at about 50° C. for about 1.5 hours. The samples generally spread well, although the concentrated corn steep liquor sample was somewhat lumpier.

Quantities of liquid (i.e., unprocessed samples) were placed in glass watch glasses in oven as controls. In each instance, alter drying, the germ material was dry to the touch, although it was evident that the concentrated liquor sample still had some moisture in areas. The lactic acid fermentation broth with cells removed samples, especially the low solids sample, was dry and "crumbly."

In contrast, the liquid control samples were not dry but extremely viscous, sticky, and coated onto the dishes. Little, if any, of the liquid sample material could be recovered from the dishes. After an additional hour of drying at about 55° C., all of the samples were removed from the oven. The spent germ-absorbed materials easily dislodged from the pans and were placed in beakers. In contrast, the somewhat burned liquid control samples could not be recovered without the addition of water and vigorous scraping. No attempts were made to remove or recover these materials.

The next day the germ samples were milled and stored for analysis. The general attributes of the recovered material are also displayed in Table III.

TABLE III

| Material/Sample | Spent Germ (gm) | Quantity of Sample Added (gm) | % Additive per gram | Weight Added (gm) | Final Weight** (gm) |
|---|---|---|---|---|---|
| Lactic Acid Fermentation Broth with cells removed | 30 | 90 (9 gm dsb) | 23% | 8.32 | 36.22 |
| Concentrated CSL | 30 | 90 (40.5 gm dsb) | 58% (29% protein*) | 46.55 | 73.47 |
| Concentrated Lactic Acid Fermentation Broth with cells removed† | 11 | 32 (8.64 gm dsb) | 44% | 7.59 | 19.2 |

†27% dsb; prepared in-house and concentrated using a rotary evaporator
*Estimated % protein content of sample
**Final Weight = entire sample (i.e., spent germ plus dry solids) after milling This experiment has demonstrated that materials which are normally recalcitrant to spray drying, oven drying and the like such as lactic acid bacteria fermentation broth and concentrated corn steep liquor can be dried to relatively high concentrations using spent germ as an absorbent and drying aid to yield dry, flowable, easy-to-handle finished materials.

Example 4

This example illustrates absorptive and drying attributes of three different materials, spent corn germ, soybean meal and linseed meal.

Materials:

Spent corn germ was obtained from Grain Processing Corporation, Muscatine, Iowa. The germ was used as received.

Soybean meal and linseed meal were obtained from a commercial source.

Concentrated corn steep liquor (CSL; about 45% dry solids basis (dsb)) was identical to the sample/material described in Example 3.

Lactic acid fermentation broth with cells removed (LAFB; about 10% dry solids basis) was also taken from the same batch of material described in Example 3.

Aliquots of CSL and LAFB were blended with the respective processing aids/absorbents at the rates listed in Table IV. These materials were processed using the methods outlined to Example 3. The characteristics of the dried materials recovered are shown in Table IV.

TABLE IV

| Germ Type (Amount) | Sample | Quantity Sample Added | Final Weight* (gm) | Weight of Added Sample Recovered (gm) |
|---|---|---|---|---|
| Soybean Meal (50 gm) | LAFB | 50 mL (10% solids) (5 gm) | 50.17 | 0.17 |
| Linseed Meal (25 gm) | LAFB | 50 mL (10% solids) (5 gm) | 26.53 | 1.53 |
| Spent Corn Germ (25 gm) | LAFB | 75 mL (10% solids) (7.5 gm) | 31.9 | 6.9 |
| Spent Corn Germ (25 gm) | CSL | 75 mL (47% solids) (7.5 gm) | 64 | 39 |
| Soybean Meal (50 gm) | CSL | 50 mL | Not recoverable | Not recoverable |
| Linseed Meal (25 gm) | CSL | 50 mL | Not recoverable | Not recoverable |

*Final weight of milled samples

The results suggest that neither soybean nor linseed meal absorbed either CSL or LAFB to the same degree as spent corn germ. The absence of sample uptake probably also explains why the soybean- and linseed meal-CSL samples could not be detached from the drying container whereas the dried spent germ-CSL sample could be readily removed and collected with mild scraping. Other than coating the surface of the soybean and linseed meal particles, the LAFB and CSL samples were not affected in a manner that contributed to enhance the drying and/or handling of these two samples.

Example 5

This example illustrates a method for enhancing uptake of solutions. The absorptive and drying use characteristics of spent germ with viscous materials such as concentrated CSL can be improved by heating the solution prior to mixing. This was observed using CSL heated to about 44° C.

When compared to CSL at room temperature (about 22.5° C.) the heated CSL was taken up much more rapidly than the room temperature CSL material. The enhanced uptake generally increased loading on the germ and facilitated drying. These findings are summarized in Table V.

Heating the CSL, to about 44° C. increased the content of CSL in the final dried material. For example, typically the maximum CSL content in the dried composite is about 50%. However, with heating the CSL cats be increased to about 65% to 75% of the weight of the final material.

TABLE V

| Sample/Temp. | Quantity of SG (gm) | Sample Added (mL) | Final Weight (gm) | CSL Content* (gm) |
|---|---|---|---|---|
| CSL (44° C.) | 25 | 100 (47 gm dsb) | 74.81 | 49.81 |
| CSL (44° C.) | 25 | 150 (70.5 gm dsb) | 94.8** | 69.8 |
| CSL (22.5° C.) | 25 | 100 | Not recoverable† | — |

*Does not account for final moisture content

**Difficult to remove from drying container, substantial scraping required

†Not recoverable means that the dried material could not be scraped from the container It is presumed that heating a viscous solution such as CSL, which is a complex mixture, decreases viscosity and enhances flowability. This and possible changes in the spent germ matrix allow the solution to flow more freely and generally improve accessibility into the matrix. Hence, any means, physical, chemical or enzymatic, to reduce viscosity (or otherwise enhance flowability) will improve the uptake and capacity of the germ matrix. This also includes the addition of surface active agents, polymers and related materials, which can affect the interaction(s) between the solution "loaded" and the germ matrix.

Example 6

This example depicts a spent germ-spore composite.

*Bacillus thuringiensis* (Bt) is grown by an appropriate culture methodology such as the method of Nickerson et al. (Appl. Microbial 28: 129-132 (1974)). The culture is propagated and the cell paste containing the spores and crystals is collected by low speed centrifugation. An aliquot of the cell paste is stored at about 2-4° C., and is suspended in chilled water to produce a slurry. This slurry is stirred, using a mixer capable of handling viscous materials. While stirring, the slow addition of spent germ is initiated. Sufficient spent germ is added to "soak-up" all of the Bt spore and crystal-containing liquid. The mixture is then subjected to room air-drying for about 24 hours at 25° C.

Example 7

This example illustrates the use of spent germ as a processing aid for facilitating the extraction of oils, lipids and related biomolecules from microorganisms.

Solvent-extracted spent germ is thoroughly blended with a relatively (2- or 3-times) concentrated fermentation broth. The whole broth saturated germ is collected and dried using a forced air dryer, such as a tunnel dryer. Upon reaching the preferred dryness, the cell-containing spent germ is extracted with solvent. It is envisioned that the spent germ may be recycled several times, thereby further reducing costs.

Example 8

This example demonstrates the utility of spent germ as a bioprocessing and drying aid and carrier for maintenance of live lactic acid bacteria. The following materials were used in this study.

Lactic acid bacteria cells were fermented on standard MRS media with gentle agitation and no aeration. Upon attaining desired cell density ($10^9$ CFU/ml), an aliquot of the fermentation whole cell broth was removed and transferred to a separate container.

Dry processed spent corn germ was obtained from Grain Processing Corporation, Muscatine, Iowa. The germ was processed by autoclaving for about 10 minutes at 121° C., 15 psi in a laboratory autoclave. The autoclaved germ was cooled using HEPA filtered air in a hood. The germ was then transferred to clean, sealable containers.

The aforementioned materials were employed as follows:

The whole cell broth was added to the processed germ at two different broth to germ ratios, 2:1 and 3:1. In both instances, the germ readily absorbed the broth and its respective constituents, both soluble and insoluble.

The fermentation broth-processed germ samples were transferred and spread-out on trays to allow for drying. The trays were transferred to a chamber where the samples were subjected to vacuum drying at a temperature of about 20° C. After drying, the samples were transferred to plastic-lined Kraft bags and stored unsealed on a laboratory bench.

Aliquots of each sample were periodically recovered and assayed for viability using standard lactic acid bacteria plating procedures. The results of the plating are shown in the Table III below.

TABLE VI

| Time in Storage | 2:1 Sample (CFU/gm) | 3:1 Sample (CFU/gm) |
|---|---|---|
| 0 (Storage initiation) | $2.4 \times 10^{10}$ | $1.7 \times 10^{10}$ |
| 2 weeks | $1.8 \times 10^{10}$ | $1.8 \times 10^{10}$ |
| 4 weeks | $1.8 \times 10^{10}$ | $1.8 \times 10^{10}$ |
| 8 weeks | $1.4 \times 10^{10}$ | $1.4 \times 10^{10}$ |
| 16 weeks | $1.4 \times 10^{10}$ | $1.8 \times 10^{10}$ |

The plating results demonstrate that there was a nominal decline in activity over a period of about 4 months. This result is extraordinary in comparison to lyophilized bacteria, which would be expected to have no viability if stored uncovered for 4 months.

It is thus seen that the invention provides a means of harvesting fermentation-derived biopolymers that is superior in many respects to the aforementioned prior art alcohol recovery process. The transformation from the dilute solution to a slurry or paste facilitates handling and drying by established, low cost methodologies. In some instances the invention may be the only economical means to recover and dry a material from a dilute solution without having to remove huge quantities of water or incurring denaturation of the biomolecule of interest while still recovering a relatively high concentration of the specific ingredient in a dry, stable, flowable powder. Further, the water absorption properties of the germ can facilitate the rate of hydration of substances such as biomolecules that do not efficiently rehydrate or hydrate only under conditions of severe agitation and mixing. The invention provides in some embodiments an animal feed that is believed to provide probiotic effects to an animal.

All references, including publications, patent applications, and patents, cited herein are hereby incorporated by reference Preferred embodiments of this invention are described herein, including the best mode known to the inventors for carrying out the invention. Variations of those preferred embodiments may become apparent to those of ordinary skill in the art upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. No no-claimed language should be deemed to limit the scope of the following claims. Any steps of mixing or addition may be performed in any scalable order or by adding ingredients simultaneously or sequentially in any suitable order.

What is a claim:

1. A composite product prepared by a method comprising: contacting an aqueous medium containing said polysaccharide with a sorbent, said sorbent comprising a spent oil-bearing residue, whereby a polysaccharide, said polysaccharide comprising a β-glucan and at least a portion of the water in said aqueous solution are sorbed by said sorbent thereby forming a composite; and
drying said composite to a moisture content of less than 20%.

2. A composite product according to claim 1, said sorbent comprising spent corn germ.

3. A composite product according to claim 1, said polysaccharide comprising scleroglucan.

4. A composite product prepared by a method comprising; contacting an aqueous medium containing a polysaccharide gum with a sorbent, said sorbent comprising a spent oil-bearing residue, whereby said polysaccharide gum and at least a portion of the water in said aqueous solution are sorbed by said sorbent thereby forming a composite; and
drying said composite to a moisture content of less than 20%.

5. A method according to claim 4, said gum being selected from group consisting of xanthan gum, gellan gum, β-glucan gums, arabinogalactan, alginates, carrageenan gum, locust bean gum, dextran, tragacanth, xylan, and alternan.

6. A composite product according to claim 5, said aqueous medium comprising an aqueous fermentation broth.

7. A method according to claim 6, said aqueous medium further including the microorganism that generated said polysaccharide.

8. A composite product according to claim 4, said sorbent having been added to the aqueous medium in an amount ranging from 1-50% by total weight of the aqueous mixture based on dry sorbent weight.

9. A composite product according to claim 4, said sorbent comprising a spent grain germ.

10. A composite product according to claim 4, said sorbent comprising spent corn germ.

11. A composite product according to claim 5, said sorbent comprising a spent grain germ.

12. A composite product according to claim 5, said sorbent comprising spent corn germ.

13. A composite product according to claim 6, said sorbent comprising a spent grain germ.

14. A composite product according to claim 6, said sorbent comprising spent corn germ.

15. A composite product according to claim 7, said sorbent comprising a spent grain germ.

16. A composite product according to claim 7, said sorbent comprising spent corn germ.

17. A composite product according to claim 1, including a film-forming polymer.

18. A composite product according to claim 1, including a binder.

19. A composite product according to claim 1, including a cohesiveness agent.

20. A composite product according to claim 4, including a film-forming polymer.

21. A composite product according to claim 4, including a binder.

22. A composite product according to claim 4, including a cohesiveness agent.

* * * * *